(12) United States Patent
Baba

(10) Patent No.: US 11,119,210 B2
(45) Date of Patent: Sep. 14, 2021

(54) VEHICLE CONTROL DEVICE AND VEHICLE CONTROL METHOD

(71) Applicant: DENSO CORPORATION, Kariya (JP)

(72) Inventor: Takahiro Baba, Kariya (JP)

(73) Assignee: DENSO CORPORATION, Kariya (JP)

( * ) Notice: Subject to any disclaimer, the term of this patent is extended or adjusted under 35 U.S.C. 154(b) by 280 days.

(21) Appl. No.: 16/461,509

(22) PCT Filed: Nov. 1, 2017

(86) PCT No.: PCT/JP2017/039544
§ 371 (c)(1),
(2) Date: May 16, 2019

(87) PCT Pub. No.: WO2018/092590
PCT Pub. Date: May 24, 2018

(65) Prior Publication Data
US 2019/0346557 A1    Nov. 14, 2019

(30) Foreign Application Priority Data
Nov. 18, 2016    (JP) .............................. JP2016-225192

(51) Int. Cl.
| | |
|---|---|
| *G01S 13/86* | (2006.01) |
| *G06T 1/00* | (2006.01) |
| *G01S 13/93* | (2020.01) |
| *G06T 7/593* | (2017.01) |
| *B60R 21/00* | (2006.01) |
| *B60T 7/22* | (2006.01) |

(52) U.S. Cl.
CPC .............. *G01S 13/93* (2013.01); *B60R 21/00* (2013.01); *B60T 7/22* (2013.01); *G01S 13/86* (2013.01); *G06T 1/0007* (2013.01); *G06T 7/593* (2017.01); *G06T 2207/30261* (2013.01)

(58) Field of Classification Search
CPC . G01S 13/86; G01S 13/93; G06T 1/00; G06T 1/0007; G06T 7/593; G06T 7/22; B60R 21/00
See application file for complete search history.

(56) References Cited

U.S. PATENT DOCUMENTS

| | | | | |
|---|---|---|---|---|
| 2007/0154063 A1* | 7/2007 | Breed | ............... | B60R 21/01538 382/100 |
| 2015/0061895 A1* | 3/2015 | Ricci | ...................... | G06Q 10/20 340/902 |
| 2017/0294123 A1 | 10/2017 | Baba | | |

FOREIGN PATENT DOCUMENTS

JP          2016066180 A       4/2016

* cited by examiner

*Primary Examiner* — Tan Q Nguyen
(74) *Attorney, Agent, or Firm* — Maschoff Brennan

(57) ABSTRACT

An ECU determines that detected first and second objects are identical as an identical object based on a first position of the first object and a second position of the second object, and calculates the position of a target object that is determined as the identical object. The ECU determines whether a current situation is such that a reliability of the identicalness determination is at a predetermined level or higher. In a case of determining the current situation to be such that the reliability is at the predetermined level or higher, the ECU calculates the position of the target object based on a first distance and a second orientation. In a case of determining the current situation not to be such that the reliability is at the predetermined level or higher, the ECU calculates the position of the target object based on a second distance and the second orientation.

6 Claims, 6 Drawing Sheets

VEHICLE CONTROL DEVICE AND VEHICLE CONTROL METHOD

CROSS REFERENCE TO RELATED APPLICATION

The present application is a national stage application of PCT Application No. PCT/JP2017/039544, filed on Nov. 1, 2017, which claims priority to JP 2016-225192 A filed on Nov. 18, 2016, the contents of which are incorporated herein by reference. Also, any applications for which a foreign or domestic priority claim is identified in the Application Data Sheet as filed with the present application are hereby incorporated by reference under 37 CFR 1.57.

TECHNICAL FIELD

The present disclosure relates to a vehicle control device and a vehicle control method for calculating a position of an object.

BACKGROUND ART

A vehicle control device has been known that uses both an image sensor and an electromagnetic wave sensor to calculate a position of an object in front of a host vehicle. For example, the vehicle control device determines whether an object detected using the image sensor is identical to an object detected using the electromagnetic wave sensor. When the object detected using the image sensor and the object detected using the electromagnetic wave sensor are determined to be identical, the vehicle control device determines calculates the position of this object from values obtained.

A distance to an object detected using the image sensor is calculated based on a distance in a depth direction from a captured image that is two-dimensional information. Thus, an error is likely to occur in the calculation of the distance to an object detected using the image sensor. PTL 1 discloses a vehicle control device, in a case where an object detected using the image sensor and an object detected using the electromagnetic wave sensor are determined to be identical, the vehicle control device calculates the position of this object by using the distance from the host vehicle to the object detected using the electromagnetic wave sensor and an orientation of this object with reference to the host vehicle detected using the image sensor.

CITATION LIST

Patent Literature

PTL 1: JP 2016-66180 A

SUMMARY OF THE INVENTION

In a case where the position of a target object is calculated using a distance to an object detected with an electromagnetic wave sensor and an orientation of an object detected with an image sensor, an error in the calculated position of the target object may be significant depending on a relationship between the distance and the orientation. For example, a significant error in the position of the target object may cause an unwanted operation in collision avoidance control using this position.

The present disclosure is provided to solve the above-described issue. An object of the present disclosure is to provide a vehicle control device and a vehicle control method capable of appropriately calculating the position of a target object using both information detected by an electromagnetic wave sensor and information detected by an image sensor.

To solve the above-described issue, the present disclosure includes an acquiring unit. The acquiring unit acquires, using an electromagnetic wave sensor, a first distance and a first orientation of a first object with respect to a host vehicle as a first position of the first object in front of the host vehicle, and acquires, using an image sensor, a second distance and a second orientation of a second object with respect to the host vehicle as a second position of the second object in front of the host vehicle. The present disclosure includes an object determining unit that determines whether the first object detected using the electromagnetic wave sensor and the second object detected using the image sensor are identical as an identical object based on the first position and the second position. The present disclosure includes a position calculating unit that calculates, based on the first position and the second position, a position of a target object that is determined as the identical object. The present disclosure includes a reliability determining unit that determines whether a current situation is such that a reliability of the identicalness determination by the object determining unit is at a predetermined level or higher.

In a case where the current situation is determined to be such that the reliability is at the predetermined level or higher, the position calculating unit calculates the position of the target object that is determined as the identical object based on the first distance and the second orientation. Otherwise in a case where the current situation is determined not to be such that the reliability is at the predetermined level or higher, the position calculating unit calculates the position of the target object that is determined as the identical object based on the second distance and the second orientation.

In a case where the object identicalness determination is performed based on a detection result from the electromagnetic wave sensor and a detection result from the image sensor, the position of a target object that is determined to be an identical object is typically calculated based on the first distance included as information about the first position and the second orientation included as information about the second position. Note that a detection accuracy of the first position or the second position may decrease depending on a varying scene of object detection, leading to a reduced reliability of the object identicalness determination. In this regard, the above-described configuration calculates the position of the target object based on the second distance and the second orientation instead of the first distance and the second orientation in a case where the identicalness determination has a low reliability. This configuration enables significant error in the position of the target object due to a low reliability of the identicalness determination to be prevented, making it possible to calculate the position of the target object appropriately.

BRIEF DESCRIPTION OF THE DRAWINGS

The foregoing and other objects, features, and advantages of the present disclosure will be more apparent from the following detailed description when taken in conjunction with the accompanying drawings.

DESCRIPTION OF EMBODIMENTS

Figure 1:
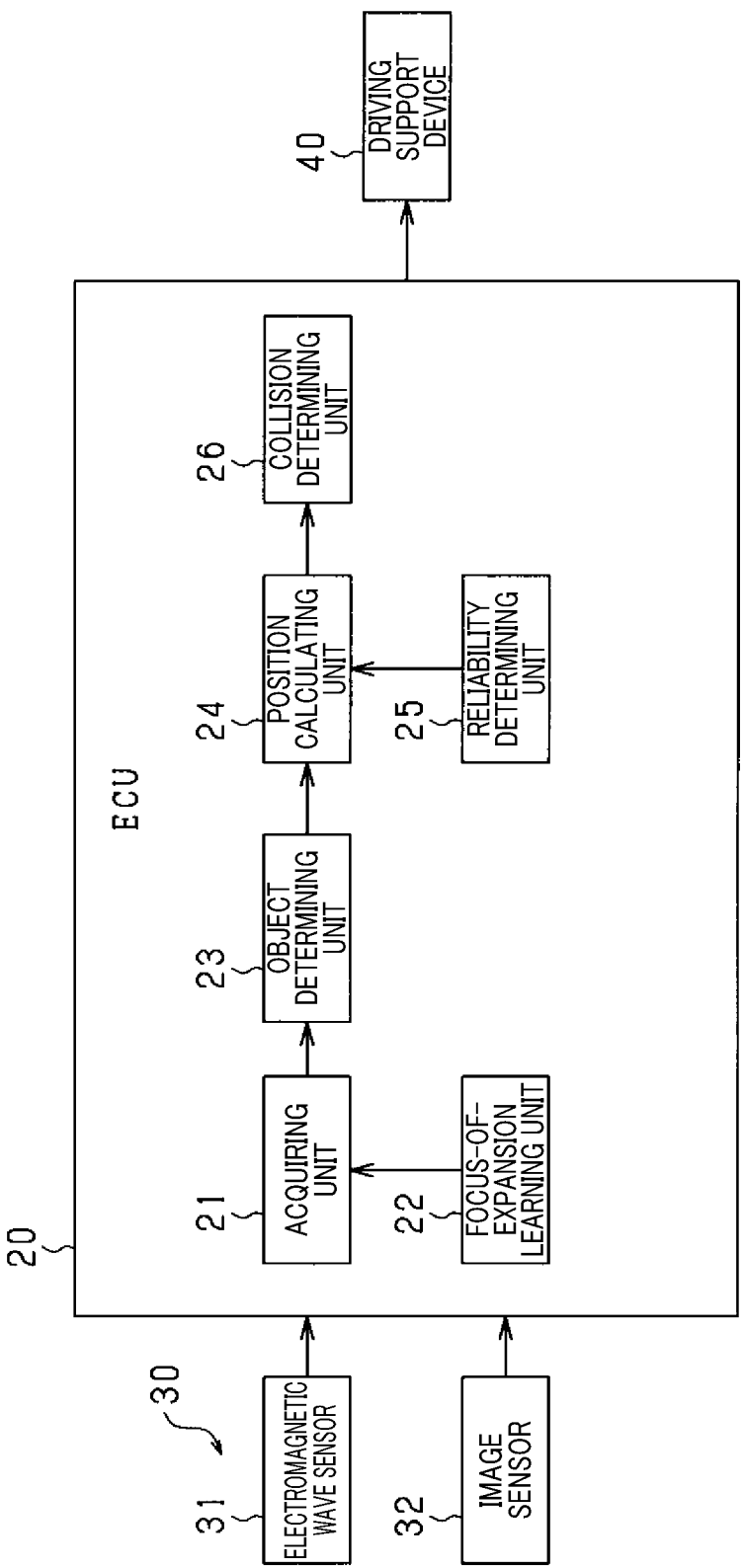
FIG. 1 is a diagram of a configuration of a vehicle control device.

Embodiments of a vehicle control device and a vehicle control method will be described below using the drawings. In the embodiments described below, the same or equivalent components are denoted by the same reference numerals throughout the figures, and descriptions of the components with the same reference numerals are incorporated.

First Embodiment

A vehicle control device 100 illustrated in FIG. 1 is mounted in a host vehicle to detect an object located in front of the host vehicle. In a case where the object and the host vehicle may collide against each other, an operation is performed that avoids a collision between the host vehicle and the object or that mitigates the collision. In the present embodiment, the vehicle control device 100 includes various sensors 30, an Electronic Control Unit (ECU) 20, and a driving support device 40.

The various sensors 30 are each connected to the ECU 20 to output a detection result for a corresponding object to the ECU 20. In FIG. 1, the various sensors 30 include an electromagnetic wave sensor 31 and an image sensor 32 acquiring captured images. In a case where, an object detected by the electromagnetic wave sensor 31 and an object detected in an image captured by the image sensor 32, of objects to be detected, are distinguished from each other, the object detected by the electromagnetic wave sensor 31 is described as an electromagnetic wave target object, and the object detected in the captured image is described as an image target object.

The electromagnetic wave sensor 31 transmits directional transmit waves such as millimeter waves or radar waves to detect, based on reflected waves generated by reflection of the transmitted waves by an electromagnetic wave target object, a position of the target object and/or a relative speed of the target object with reference to the host vehicle.

The image sensor 32 is disposed on a front side of the host vehicle CS such that the imaging direction is directed to the front of the host vehicle. The image sensor 32 acquires a captured image resulting from imaging of the front of the host vehicle, and outputs the captured image to the ECU 20 with a predetermined period. The image sensor 32 is comprised of imaging elements such as Charge Coupled Devices (CCD) arranged in a matrix; the number of the imaging elements is determined based on a required resolution. A captured image acquired by the image sensor 32 is formed of pixels corresponding to the resolution of the image sensor 32. In the present embodiment, the image sensor 32 is described as a monocular camera but a stereo camera may be used as the image sensor 32.

The ECU 20 is configured as a well-known computer including, for example, a CPU, a ROM, and a RAM. The CPU executes programs stored in the ROM to implement functions to calculate the position of an object in front of the host vehicle and to determine a possibility of a collision against the object using the calculated position of the object.

Now, among the functions implemented by the ECU 20, functions related to calculation of the position of an object will be described.

Figure 2:
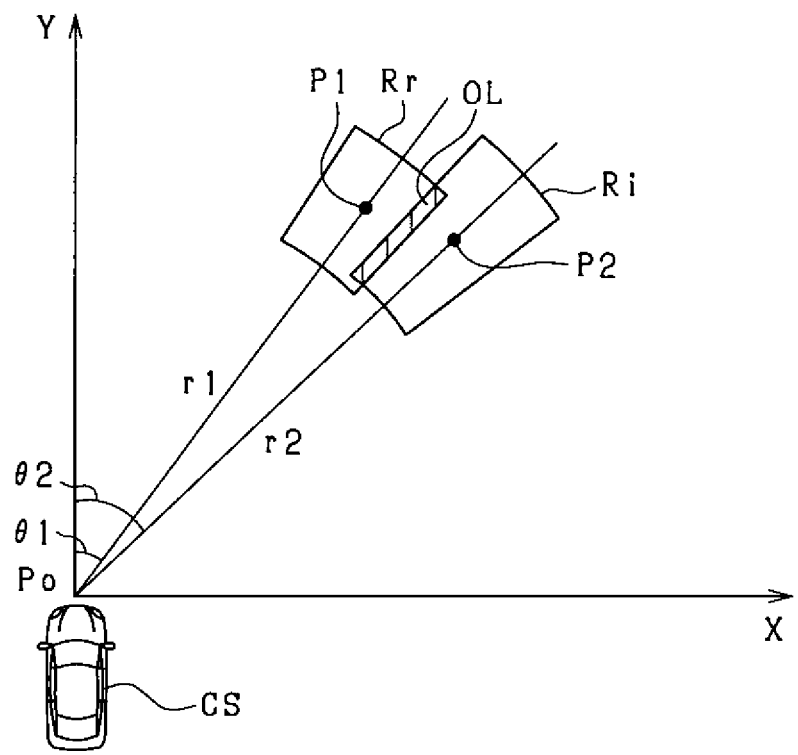
FIG. 2 is a diagram illustrating a first position and a second position.

An acquiring unit 21 acquires a first position of a first object in front of the host vehicle detected by the electromagnetic wave sensor 31 and a second position of a second object detected from a captured image captured by the image sensor 32. As illustrated in FIG. 2, the acquiring unit 21 acquires a first position P1 and a second position P2 as positions on an XY plane in which an X direction corresponds to a lateral direction of the host vehicle and in which a Y direction corresponds to an extending direction of an imaging axis of the image sensor 32. The XY plane illustrated in FIG. 2 has, as its origin Po, a position in a leading end of the host vehicle CS at which the electromagnetic wave sensor 31 is mounted.

The first position P1 includes a first distance r1 from the host vehicle to the first object and a first orientation θ1 centered on the host vehicle. The first distance r1 is acquired as a linear distance from the host vehicle to the first object. Furthermore, the first orientation θ1 is indicative of an angle between the first object and a Y axis serving as a reference axis.

The second position P2 includes a second distance r2 from the host vehicle to the second object and a second orientation θ2 centered on the host vehicle. The second distance r2 is acquired as a linear distance from the host vehicle to the second object. Furthermore, the second orientation θ2 is an angle between the second object and the Y axis serving as the reference axis.

Figure 3:
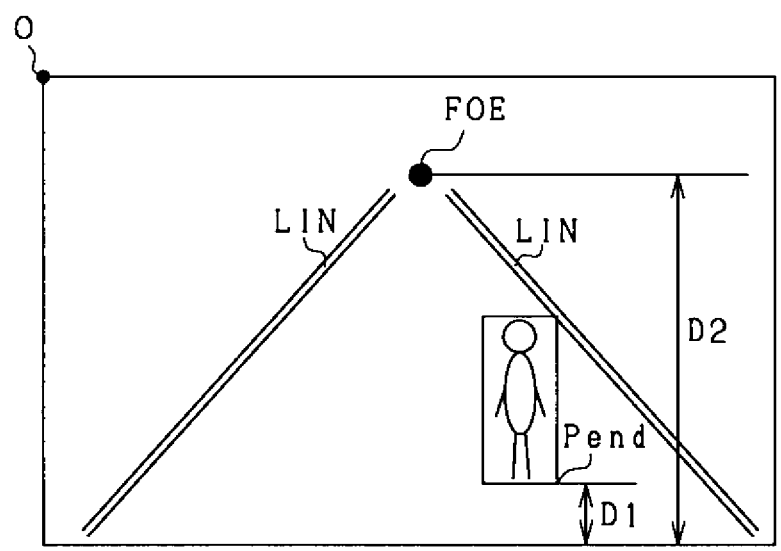
FIG. 3 is a diagram illustrating calculation of a second distance included in a second position.

In the present embodiment, the acquiring unit 21 detects the second distance based on a lower end of a second object recognized in the captured image. Specifically, first, the acquiring unit 21 recognizes the second object from the captured image based on a template matching process using a pre-registered dictionary. Templates of the dictionary are prepared for the respective types of entire objects. As illustrated in FIG. 3, the second position of the second object is calculated based on a ratio between a length D1 from a position Pend of the lower end of the second object recognized in the captured image to a lower end of the captured image and a length D2 from a pre-calculated Focus of Expansion (FOE) in the captured image to the lower end of the captured image.

The position Pend of the lower end of the second object in the captured image can be calculated based on the number i of pixels constituting the captured image in a horizontal direction and the number j of pixels constituting the captured image in a vertical direction. For example, in a case where coordinates (i, j) of an upper left vertex O of the captured image illustrated in FIG. 3 are specified as (0, 0), the length D1 can be calculated based on the number of pixels from the position Pend of the lower end to the lower end of the captured image in the vertical direction. Similarly, the length D2 can be calculated from the number of pixels from the focus of expansion FOE to the lower end of the captured image in the vertical direction.

A focus-of-expansion learning unit 22 calculates the focus of expansion in the captured image through a well-known learning process. For example, the focus-of-expansion learning unit 22 recognizes section lines LIN located on the left and right of the host vehicle from the captured image, and obtains an intersection point on extension lines of the section lines LIN to accordingly calculate an estimated position of the focus of expansion FOE. Then, well-known optical flows are calculated for a predetermined static object or the like, and based on the optical flows, the estimated position is corrected to learn the appropriate position of the focus of expansion FOE. Here, each optical flow indicates a vector field of a corresponding pixel recognized on the captured image. For example, a white line, a tree, or the like, which is a static object, is detected moving in such a manner as to appear from the focus of expansion. Thus, the appearance points of such a static object are detected a plurality of times, and learning is performed so that the estimated position of the focus of expansion FOE becomes an appropriate position based on each of the detected appearance points.

An object determining unit 23 determines whether a first object detected by the electromagnetic wave sensor 31 and a second object detected in the captured image are identical based on the first position and the second position acquired by the acquiring unit 21. The object determining unit 23 of the present embodiment determines an electromagnetic wave target and an image target to be an identical target object, in a case where an overlapping area OL is present between an electromagnetic-wave search area Rr set based on the first position and an image search area Ri set based on the second position.

As illustrated in FIG. 2, the electromagnetic-wave search area Rr is defined as an area having a margin corresponding to an expected error preset based on the characteristics of the electromagnetic wave sensor 31, in each of a distance direction and an orientation direction, with reference to the first position P1. For example, the object determining unit 23 sets an area extending by an expected error in the distance direction and an expected error of an angle in the orientation direction, from the first position P1 (r1, θ1), as the electromagnetic-wave search area.

The image search area Ri is an area having a margin corresponding to an expected error preset based on the characteristics of the image sensor 32, in each of the distance direction and the orientation direction, with reference to the second position P2. For example, in FIG. 2, the object determining unit 23 sets an area extending by an expected error in the distance direction and an expected error of an angle in the orientation direction, from the second position P2 (r2, θ2), as the image search area Ri.

A position calculating unit 24 calculates the position of the identical target object that has been determined based on the first position and the second position. The position calculating unit 24 of the present embodiment calculates a lateral position SP that is a position in the lateral direction with reference to the host vehicle, as the position of the target object.

Figure 4:
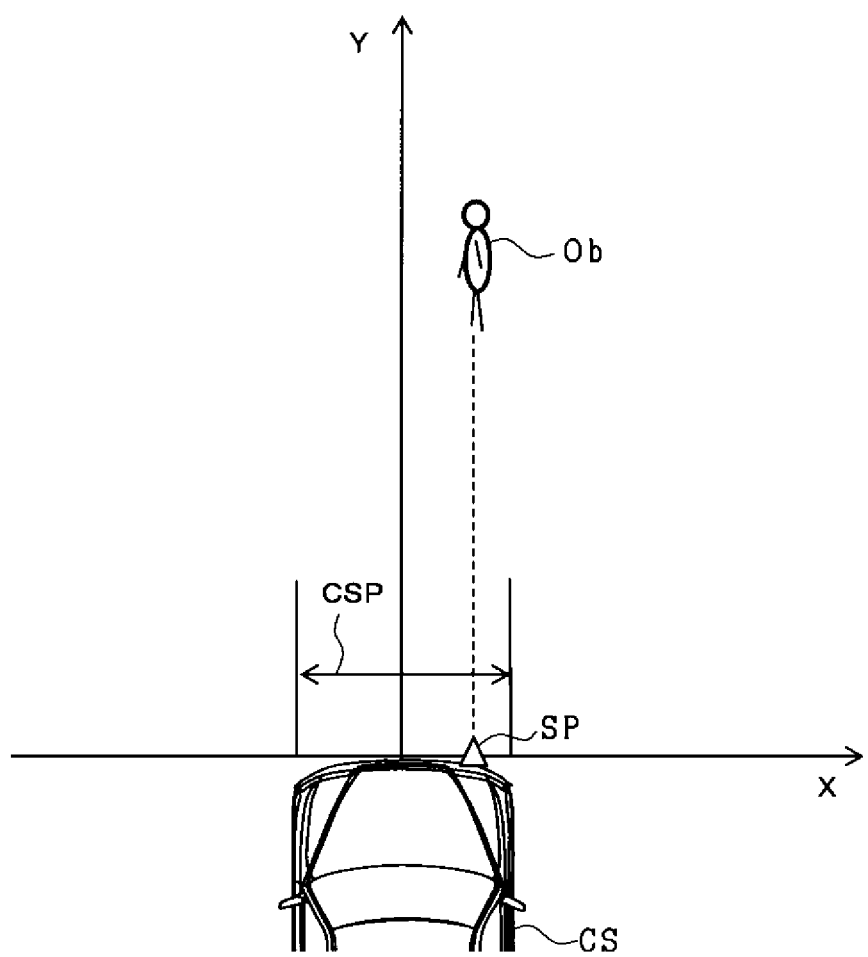
FIG. 4 is a diagram illustrating object collision determination.

A collision determining unit 26 determines whether the target object may collide against the host vehicle based on the lateral position of the target object calculated by the position calculating unit 24. As illustrated in FIG. 4, in a case where the calculated lateral position SP is within a collision lateral position range CSP set in front of the host vehicle, the collision determining unit 26 calculates a Time to Collision (TTC) between the target object and the host vehicle to accordingly determine whether the target object may collide against the host vehicle.

The collision lateral position range CSP is a range set in front of the host vehicle and extending in the lateral direction, i.e. X direction from the center of the host vehicle. Furthermore, the Time to Collision is an evaluation value indicating how many seconds will elapse until the host vehicle collides against the target object in a case where the host vehicle travels with the current speed of the host vehicle maintained. The possibility of a collision increases with decreasing the Time to Collision, and decreases with increasing the Time to Collision. The Time to Collision can be calculated by a method such as dividing a distance between the target object and the host vehicle in a traveling direction by a relative speed of the target object with reference to the host vehicle. The relative speed is acquired by the electromagnetic wave sensor 31.

The driving support device 40 is an alarm device giving an alarm to a driver and/or a brake device reducing a vehicle speed of the host vehicle, and performs an object collision avoiding operation and/or an object collision mitigating operation based on a determination result from the collision determining unit 26. In a case where the driving support device 40 is a brake device, the driving support device 40 operates an automatic brake in a case of determining that the host vehicle and the target object may collide against each other. Furthermore, in a case where the driving support device 40 is an alarm device, the driving support device 40 sounds an alarm in a case of determining that the host vehicle and the target object may collide against each other.

The first position detected by the electromagnetic wave sensor 31 is known to be higher accuracy in distance than the second position detected by the electromagnetic wave sensor 31. Furthermore, the second position is known to be higher accuracy in orientation than the first position. Thus, the calculated lateral position of the target object is considered to be made higher accuracy by calculating the lateral position of the target object based on the first distance and the second orientation. Note that a detection accuracy of the first position or the second position may decrease depending on a varying scene in object detection, leading to a reduced reliability of the object identicalness determination. For example, in a case where different objects are located at close range, the object determining unit 23 may perform the identicalness determination based on the first position detected from one of the objects and the second position detected from the other object. In this case, when the lateral position of the identical target object is calculated from the first distance and the second orientation, the calculated lateral position of the target object may be displaced from the actual lateral position of the target object in the lateral direction.

Thus, the ECU 20 of the present embodiment determines a situation where the reliability of the identicalness determination by the object determining unit 23 is at a predetermined level or higher, and calculates the lateral position of the target object from the first distance and the second orientation in the situation where the reliability is at the predetermined level or higher. Accordingly, the ECU 20 includes a reliability determining unit 25 to determine the situation where the reliability of the identicalness determination is at the predetermined level or higher.

The reliability determining unit 25 determines whether a current situation is such that the reliability of the identicalness determination by the object determining unit 23 is at the predetermined level or higher. Here, the reliability of the identicalness determination refers to an index value indicative of the degree of certainty to which the image target and the electromagnetic wave target determined to be identical by the object determining unit 23 are identical. The reliability is set such that the degree of certainty of the identicalness determination increases with an increase in the value of the reliability. In the present embodiment, for determination of the situation where the reliability of the identicalness determination is equal to or higher than the predetermined level, the accuracy of each of the first position and the second position detected from the object is determined.

The position calculating unit 24 calculates the lateral position of the target object based on the first distance and the second orientation in a case where it is determined that the reliability of the object identicalness determination in the current situation is at the predetermined level or higher, and calculates the lateral position of the target object based on the second distance and the second orientation in a case where it is determined that the reliability in the current situation is not at the predetermined level or higher.

Figure 5:
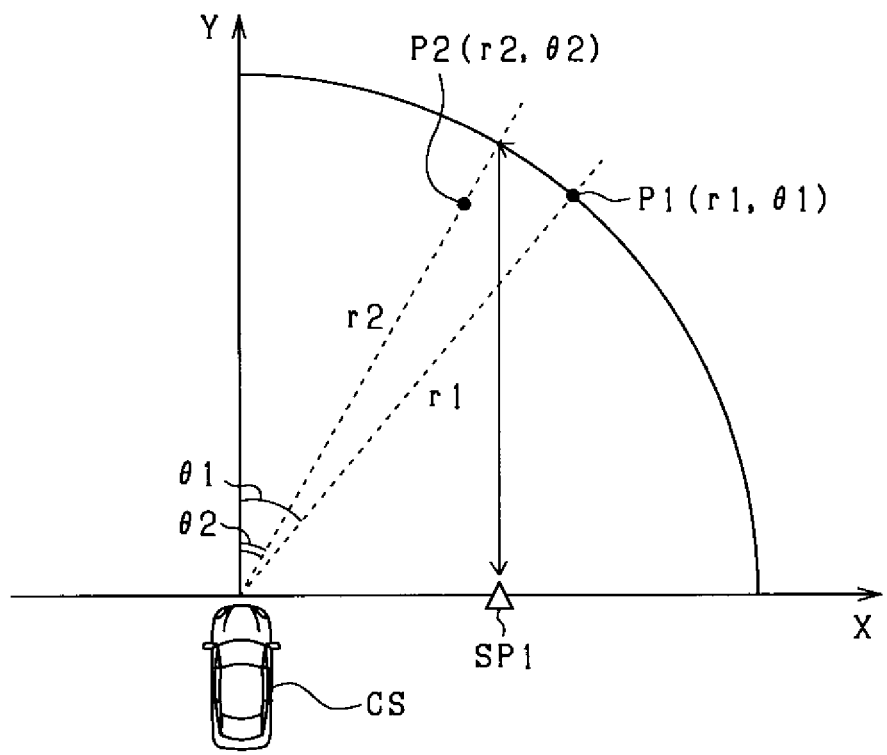
FIG. 5 is a diagram illustrating a position of a target object calculated using a first distance and a second orientation.

As illustrated in FIG. 5, a lateral position SP1 of a target object calculated from the first distance r1 and the second orientation θ2 is calculated as a position, in the lateral direction, of a point where a circular arc with a radius corresponding to the first distance r1 intersects with a straight line with an inclination corresponding to the second orientation θ2 in the XY plane with reference to the host vehicle CS.

Figure 6:
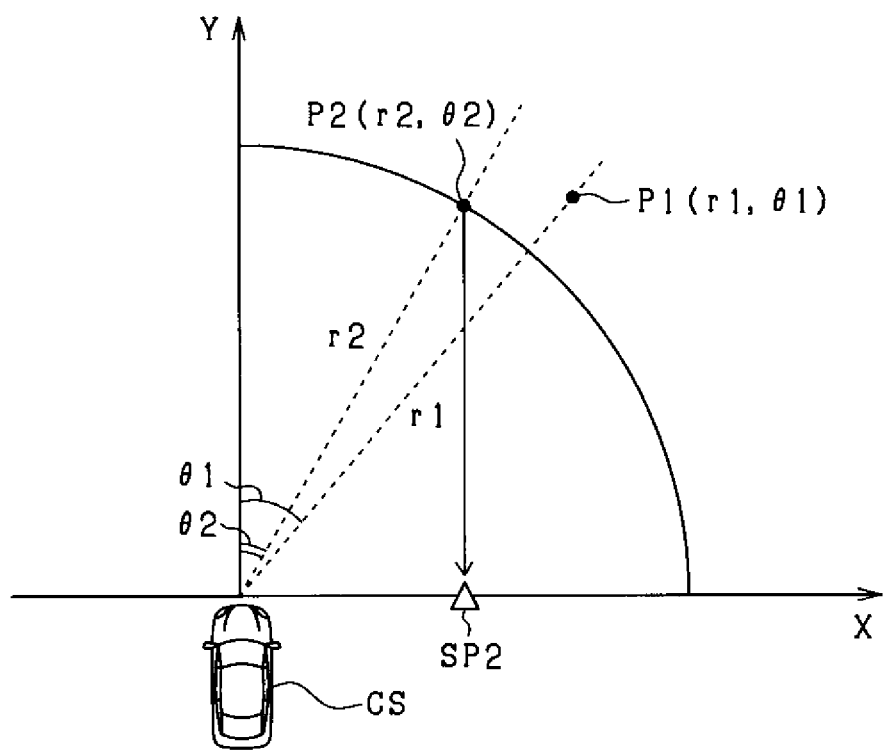
FIG. 6 is a diagram illustrating a position of a target object calculated using the second distance and the second orientation.

As illustrated in FIG. 6, a lateral position SP2 of a target object calculated from the second distance r2 and the second orientation θ2 is calculated as a position, in the lateral direction, of a point where a circular arc with a radius corresponding to the second distance r2 intersects with a straight line with an inclination corresponding to the second orientation θ2 in the XY plane with reference to the host vehicle CS.

Figure 7:
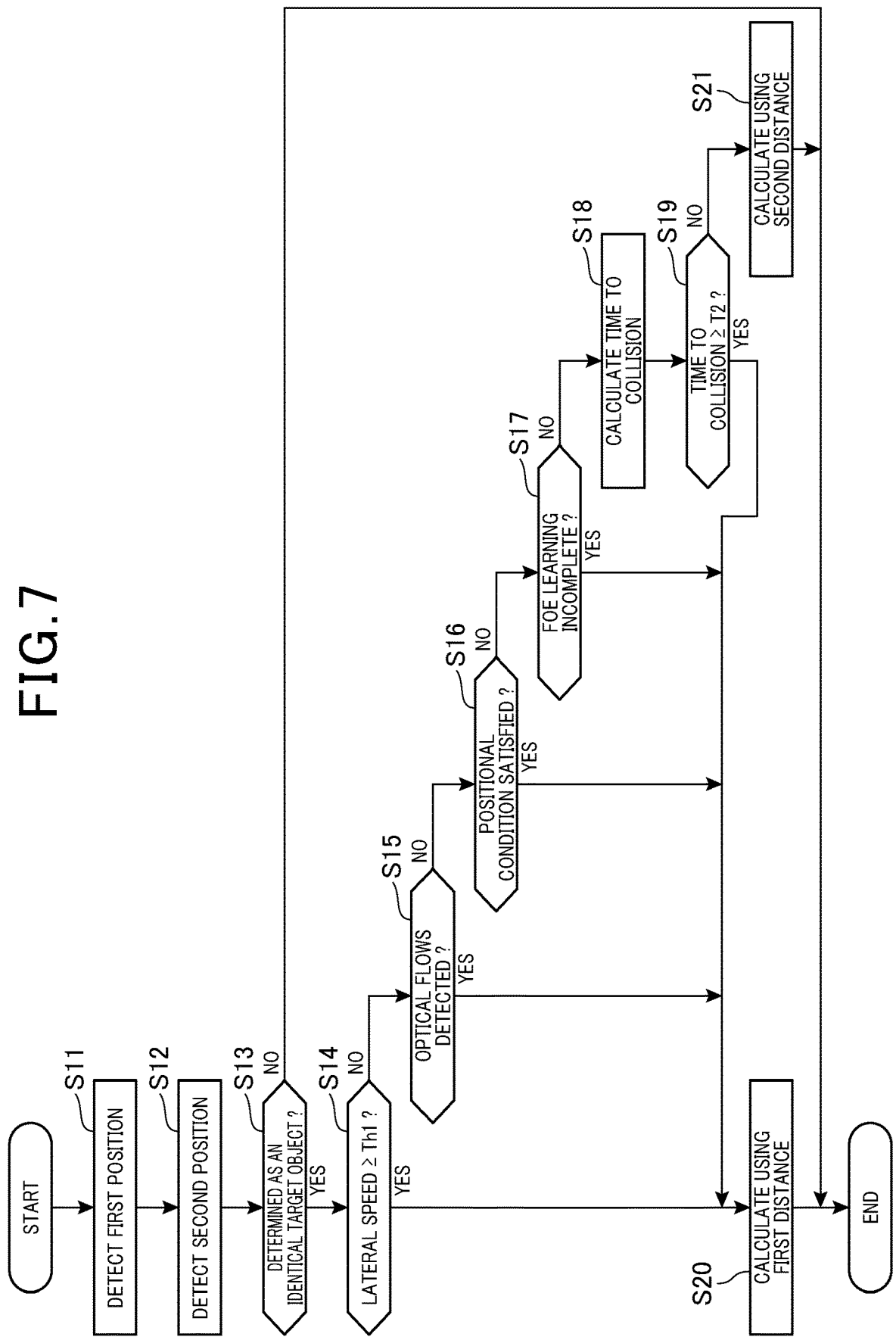
FIG. 7 is a diagram illustrating a method for calculating the position of a target object.

Now, a method for calculating the lateral position of the target object will be described using FIG. 7, the method being implemented by the ECU 20. The ECU 20 carries out a process illustrated in FIG. 7 with a predetermined period. Furthermore, in this example, a case where a pedestrian moving in a direction approaching the front of the host vehicle is to be detected as a target object will be described as an example.

First, in step S11, the first position is detected that is a result of detection of the electromagnetic wave target by the electromagnetic wave sensor 31. Furthermore, in step S12, the second position is detected that is a result of detection of the image target in the captured image. Each of steps S11 and S12 functions as an acquiring step.

In step S13, the ECU 20 determines, based on the first position and the second position, the electromagnetic wave target and the image target to be an identical target object. In this embodiment, in a case where an overlapping area is present between the electromagnetic-wave search area and the image search area, the electromagnetic wave target and the image target are determined to be identical as an identical target object (step S13: YES). On the other hand, in a case where the electromagnetic wave target and the image target are determined not to be identical (step S13: NO), the process illustrated in FIG. 7 is temporarily ended. Step S13 functions as an object determining step.

In a case where the electromagnetic wave target and the image target are determined to identical as an identical target object (step S13: YES), the ECU 20 determines, in each of steps S14 to S16, whether the current situation is such that the reliability of the object identicalness determination is at the predetermined level or higher. Each of steps S14 to S16 functions as a reliability determining step.

First, in each of steps S14 and S15, an accuracy of the second position is determined. The ECU 20 of the present embodiment determines the accuracy of the second position based on whether the pedestrian, which has been determined as the identical target object, is moving toward the front of the host vehicle. In particular, in step S14, the ECU 20 determines whether a lateral speed of the pedestrian on the captured image is higher than or equal to a threshold Th1.

Figure 8:
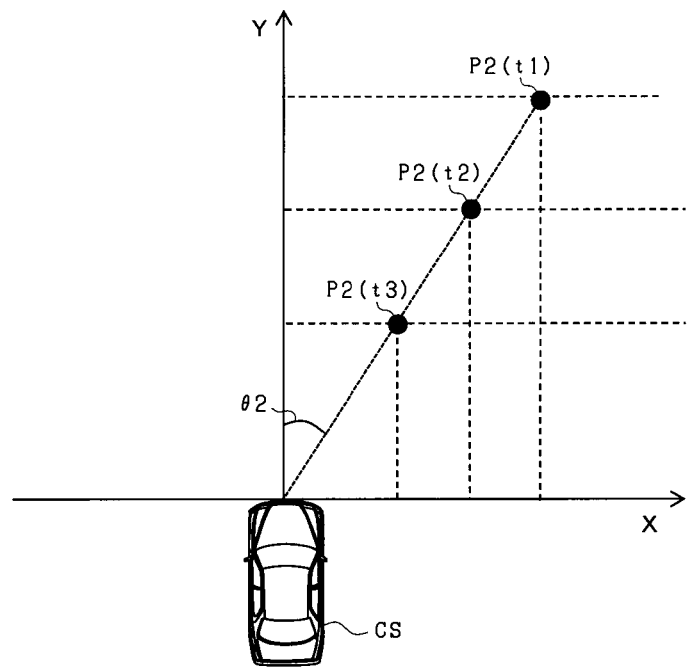
FIG. 8 is a diagram illustrating determination of reliability of identicalness determination.

FIG. 8 is a diagram illustrating determination of the reliability of the identicalness determination. FIG. 8 illustrates a moving trajectory of the second position P2 detected from the pedestrian moving at a predetermined speed or higher in the lateral direction from point of time t1 to point of time t3.

In a case where the pedestrian is moving in the lateral direction so as to approach the front of the host vehicle, a variation in the position of the pedestrian on the XY plane is represented by a moving trajectory with an inclination corresponding to the second orientation θ2 by synthesizing a variation in the position of the pedestrian in the lateral direction and a variation in position in the traveling direction. Thus, in a case where the second position is detected from a laterally moving object, if a pedestrian in the captured image is varying in a direction approaching the front of the host vehicle at a speed higher than or equal to the threshold Th1, the second orientation θ2 is likely to be detected from the pedestrian approaching the front of the host vehicle. On the other hand, in a case where the speed of the object from which the second position has been detected on the captured image is lower than the threshold Th1, the second position is less likely to be detected from the laterally moving pedestrian.

In a case where the moving speed of the pedestrian in the lateral direction is detected in the direction approaching the lane of the host vehicle and is higher than or equal to the threshold Th1 (step S14: YES), the current situation is determined to be such that the reliability of the identicalness determination is at the predetermined level or higher, and the process proceeds to step S20. On the other hand, in a case where the moving speed of the pedestrian in the lateral direction is lower than the threshold Th1 (step S14: NO), the process proceeds to step S15.

The threshold Th1 is set based on a speed at which the movement of a target object in the lateral direction can be detected, and has a value set according to the type of the target object. The target object of the present embodiment is a pedestrian, and thus, the threshold Th1 can be a value of, for example, 1 km/h to 15 km/h.

In step S15, the ECU 20 determines whether the movement of the pedestrian in the direction approaching the front of the host vehicle is detectable based on optical flows calculated from corresponding pixels constituting the pedestrian on the captured image. Even in a case where the lateral speed of the pedestrian on the captured image is lower than or equal to the threshold Th1, the ECU 20 of the present embodiment determines that the pedestrian is moving in the direction approaching the lane of the host vehicle using the optical flows.

In a case of determining that the pedestrian is moving in the direction approaching the front of the host vehicle using the optical flows (step S15: YES), the ECU 20 determines that the current situation is such that the reliability of the identicalness determination is at the predetermined level or higher, and proceeds to step S20.

In a case where the movement of the pedestrian in the direction approaching the host vehicle is undetectable (step S15: NO), the accuracy of the first position is determined in step S16. The ECU 20 of the present embodiment determines whether the first distance from the host vehicle, included in the first position, is shorter than the second distance from the host vehicle, included in the second position.

Figure 9:
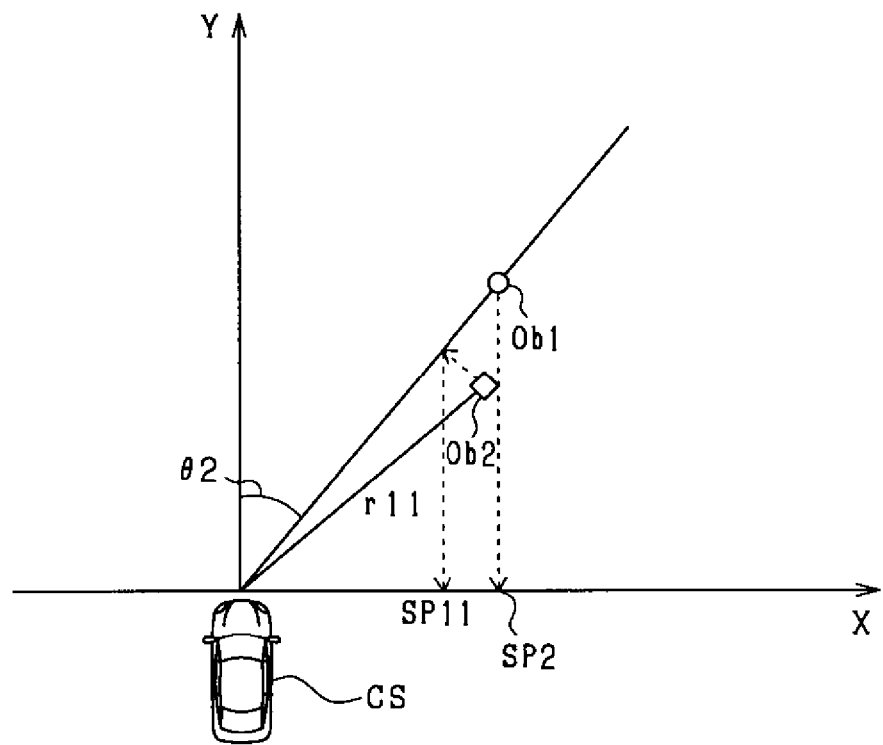
FIG. 9 is a diagram illustrating the position of a target object calculated in accordance with a positional relationship between a first distance and a second distance.

The example illustrated in FIG. 9 illustrates that the other object Ob2 such as a road sign is present close to the pedestrian Ob1 with respect to the host vehicle, the other object Ob2 having a higher electromagnetic-wave reflection intensity than the pedestrian Ob1, and that the electromagnetic wave sensor 31 detects reflected waves from the other object Ob2 rather than reflected waves from the pedestrian Ob1. Here, the other object is an object having a high reflection intensity compared to a pedestrian, and the other object of the present embodiment includes a road sign, a guard rail, and a pole with a reflector, etc.

In a case where the first distance from the host vehicle is shorter than the second distance from the host vehicle, the ECU 20 may detect the first position and the second position from different objects. In FIG. 9, the other object Ob2 is present closer to the host vehicle than the pedestrian Ob1 is, and the electromagnetic wave sensor 31 calculates the first position from the other object Ob2. In such a case, the first position used for the identicalness determination by the ECU 20 has a low accuracy. Thus, the ECU 20 compares the first distance included in the first position acquired in step S11 with the second distance included in the second position acquired in step S12 to determine which of the distances from the host vehicle is shorter.

In a case of determining that the first distance from the host vehicle is longer than the second distance from the host vehicle (step S16: YES), the ECU 20 determines that the current situation is such that the reliability of the identicalness determination is at the predetermined level or higher, and proceeds to step S20. On the other hand, in a case of determining that the first distance from the host vehicle is shorter than the second distance from the host vehicle (step S16: NO), the ECU 20 determines the current situation not to be such that the reliability of the identicalness determination is at the predetermined level or higher, and proceeds to step S17.

In step S17, the ECU 20 determines whether the FOE learning is completed. In a case where the FOE learning is incomplete, the focus of expansion is not set at the appropriate position, and the second distance calculated based on the FOE may have a low accuracy. In this case, a decrease in the accuracy of the lateral position of the target object can be suppressed by calculating the lateral position of the target object using the first distance and the second orientation rather than based on the second distance and the second orientation.

In a case where the focus of expansion learning is determined to be incomplete (step S17: YES), the process proceeds to step S20, and the lateral position of the pedestrian is calculated using the first position and the second orientation. On the other hand, in a case where the focus of expansion learning is completed (step S17: NO), the process proceeds to step S18.

In step S18, the Time to Collision is calculated that is indicative of the time until the pedestrian and the host vehicle may collide against each other. The Time to Collision calculated in step S18 is indicative of the time until a possible collision in a case where the host vehicle travels with the current vehicle speed maintained, toward a position indicative of the current position of the pedestrian. In the determination in step S16 of the present embodiment, the first position is likely to be detected from the other object. Thus, the ECU 20 divides the second distance detected in step S12 by the relative speed of the pedestrian with reference to the host vehicle to calculate the Time to Collision. Step S18 functions as a Time to Collision calculating unit and a Time to Collision calculating step.

Alternatively, the first distance detected in step S11 may be divided by the relative speed of the pedestrian with reference to the host vehicle.

In step S19, the ECU 20 determines whether the Time to Collision calculated in step S18 is more than or equal to a threshold T2. A long time until a possible collision between the pedestrian and the host vehicle represents a low possibility of an immediate collision between the pedestrian and the host vehicle. Thus, even a less accurate position of the pedestrian has little adverse effect. Accordingly, in a case where the Time to Collision until a possible collision between the pedestrian and the host vehicle is longer than or equal to the threshold T2 (step S19: YES), the process proceeds to step S20 to calculate the position of the pedestrian using the first distance and the second orientation.

The threshold Th2 is desirably set based on a sufficient time to avoid a collision of between the host vehicle and the pedestrian located in front of the host vehicle. Typically, in a case where a warning is issued to the driver to avoid a possible collision between the host vehicle and the object in front of the host vehicle, the Time to Collision is set to 0.8 seconds or longer. Thus, the threshold Th2 of the present embodiment is a value obtained by adding a margin to 0.8 seconds.

On the other hand, in a case where the Time to Collision is less than the threshold Th2 (step S19: NO), the position of the pedestrian is calculated using the second position and the second orientation in step S21. In this case, the current situation is determined not to be such that the reliability of the identicalness determination is at the predetermined level or higher. Thus, the position of the pedestrian is calculated using the second distance and the second orientation detected from the captured image, to prevent a decrease in the accuracy of the lateral position of the target object from increasing. Each of Steps S20 and S21 functions as a position calculating step.

The present embodiment described above in detail has the following excellent effects.

In a case where the identicalness determination has a low reliability, the ECU 20 calculates the position of a target object based on the second distance and the second orientation instead of the first distance and the second orientation. This configuration enables significant error in the position of the target object due to a low reliability of the identicalness determination to be prevented, making it possible to calculate the position of the target object appropriately.

In a case where the position of an object has changed along the direction approaching the front of the host vehicle, the second orientation is likely to have been detected from a pedestrian moving in the lateral direction. In this regard, in the above-described configuration, the ECU 20 acquires the first position and the second position of the object located in front of the host vehicle and moving in the lateral direction. The ECU 20 then determines whether an object, which is determined to be an identical target object, is moving toward the front of the host vehicle, and in a case where the target object is moving toward the front of the host vehicle, determines the current situation to be such that the reliability of the identicalness determination is at the predetermined level or higher. In this case, the situation where the identicalness determination has a high reliability can be determined by a simple approach using the moving speed of the target object in the lateral direction.

In a case where, in front of a target object to be detected, a different object is present, the electromagnetic wave sensor 31 may detect, from the different object, the first distance corresponding to the first position. In this regard, in the above-described configuration, the ECU 20 determines the current situation to be such that the object identicalness determination has a low reliability in a case where the first distance from the host vehicle is shorter than the second distance from the host vehicle. In this case, the situation where the identicalness determination has a low reliability can be determined by a simple approach based on the positional relationship between the first distance and the second distance.

In a case where the second distance is calculated based on the position of the focus of expansion in the captured image, an error in the position of the focus of expansion is likely to cause the second distance to exhibit an inappropriate value. This may make an error in the position of a target object calculated based on the second distance and the second orientation increased. In this regard, in the above-described configuration, even in a case where the current situation is determined to be such that the reliability of the object identicalness determination is at the predetermined level or lower, the ECU 20 calculates the position of the target object based on the first distance and the second orientation in a case where the learning of the focus of expansion is incomplete. This configuration enables an increase in error in the position of the target object due to an error in the second distance to be suppressed.

In a case of a long Time to Collision until a possible collision between a target object and the host vehicle, the target object is less likely to collide immediately against the host vehicle. Thus, a low accuracy of the position of the target object has little adverse effect on collision avoidance control using this position. In this regard, in the above-described configuration, even in the case where the current situation is determined to be such that the reliability of the object identicalness determination is at the predetermined level or lower, the ECU 20 calculates the position of the target object based on the first distance and the second orientation in a case where the Time to Collision is longer than or equal to the threshold. In a case where the target object and the host vehicle are less likely to collide against each other, giving priority to calculation of the position of the target object based on the first distance and the second orientation enables a variation in the calculated position of the target object in time sequence to be suppressed.

Other Embodiments

The following may be adopted as a method for determining whether detected objects are identical. The Time to Collision until the electromagnetic wave target may collide against the host vehicle is calculated based on the first position. The Time to Collision until the image target may collide against the host vehicle is calculated based on the second position. Then in step S13 in FIG. 7, in a case where a difference between the calculated times to collision is smaller than or equal to a threshold, the electromagnetic wave target and the image target are determined to be an identical target object. Furthermore, in step S13, conditions for determining that the detected objects are identical may be that the difference between the times to collision is smaller than or equal to the threshold and that an overlapping range is present between an electromagnetic-wave search range and an image search range.

In determining the situation where the reliability of the identicalness determination is at the predetermined level or higher, the ECU 20 may determine one of a case where a target object is moving so as to approach the front of the host vehicle or a case where the first distance from the host vehicle detected from a first object is longer than the second distance from the host vehicle detected from a second object.

In determining the situation where the reliability of the identicalness determination is at the predetermined level or higher, the ECU 20 may determine the accuracy of the first position before determining the accuracy of the second position. In this case, the process in steps S14 and S15 follows the determination of whether the first distance from the host vehicle is longer than the second distance from the host vehicle.

The ECU 20 may determine the accuracy of the first position based on a reflected wave intensity obtained when the first position is detected. In this case, in step S16 in FIG. 7, the ECU 20 compares a threshold with the reflected wave intensity obtained when the first position is detected, and in a case where the reflected wave intensity is higher than or equal to the threshold, determines the current situation to be such that the reliability of the identicalness determination is at the predetermined level or higher.

The image sensor 32 may image the front of the host vehicle to detect the second position from the captured image. In this case, the image sensor 32 uses well-known template matching to detect an object such as a pedestrian from the captured image.

For the object, calculation of the position of a pedestrian may be replaced with calculation of the position of a bicycle or a vehicle located in front of the host vehicle.

Although the present disclosure has been described in accordance with embodiments, it is to be understood that the present disclosure is not limited to these embodiments and structures. The present disclosure encompasses various modified examples, and alterations that come within an equivalent scope. Furthermore various combinations and forms, including combinations and forms that contain more than one or less than one of the elements, also come within the scope and conceptual range of the present disclosure.

The invention claimed is:

1. A vehicle control device comprising:
an acquiring unit that:
acquires, using an electromagnetic wave sensor, a first distance and a first orientation of a first object with respect to a host vehicle as a first position of the first object in front of the host vehicle, and
acquires, using an image sensor, a second distance and a second orientation of a second object with respect to the host vehicle as a second position of the second object in front of the host vehicle;
an object determining unit that determines as an object identicalness determination, whether the first object detected using the electromagnetic wave sensor and the second object detected using the image sensor are identical as an identical object based on the first position and the second position;
a position calculating unit that calculates, based on the first position and the second position, a position of a target object that is determined as the identical object; and
a reliability determining unit that determines whether a current situation is such that a reliability of the object identicalness determination by the object determining unit is at a predetermined level or higher, wherein in a case where the current situation is determined to be such that the reliability is at the predetermined level or higher, the position calculating unit calculates the position of the target object that is determined as the identical object based on the first distance and the second orientation, and in a case where the current situation is determined not to be such that the reliability is at the predetermined level or higher, the position calculating unit calculates the position of the target object that is determined as the identical object based on the second distance and the second orientation.

2. The vehicle control device according to claim 1, wherein the acquiring unit acquires:
the first position of the first object moving in a lateral direction in front of the host vehicle; and
the second position of the second object moving in the lateral direction in front of the host vehicle;
the reliability determining unit determines whether the target object that is determined as the identical object is moving toward the front of the vehicle, and
in a case where the target object that is determined as the identical object is moving toward the front of the host vehicle, the reliability determining unit determines the current situation to be such that the reliability of the object identicalness determination is at the predetermined level or higher.

3. The vehicle control device according to claim 1, wherein the reliability determining unit determines whether the first distance from the host vehicle is shorter than the second distance from the host vehicle, and in a case where the first distance from the host vehicle is shorter than the second distance from the host vehicle, the reliability determining unit determines the current situation not to be such that the reliability of the object identicalness determination is at the predetermined level or higher.

4. The vehicle control device according to claim 1, further comprising a focus-of-expansion leaning unit that learns a position of a focus of expansion in the captured image, wherein
the second distance is detected based on the position of the focus of expansion in the captured image, and
even in a case where the current situation is determined not to be such that the reliability of the object identicalness determination is at the predetermined level or higher, the position calculating unit calculates the position of the target object that is determined as the identical object based on the first distance and the second orientation in a case where learning of the focus of expansion is incomplete.

5. The vehicle control device according to claim 1, further comprising a Time to Collision calculating unit that calculates a Time to Collision indicative of a time until the target object that is determined as the identical object collides against the host vehicle based on the first position or the second position of the target object that is determined as the identical object, wherein
even in a case where the current situation is determined not to be such that the reliability of the object identicalness determination is at the predetermined level or higher, the position calculating unit calculates the position of the target object that is determined as the identical object based on the first distance and the second orientation in a case where the Time to Collision is longer than or equal to a threshold.

6. A vehicle control method comprising:

acquiring, using an electromagnetic wave sensor, a first distance and a first orientation of a first object with respect to a host vehicle, and acquiring, using an image sensor, a second distance and a second orientation of a second object with respect to the host vehicle;

determining, as an identicalness determination, whether the first object detected using the electromagnetic wave sensor and the second object detected using the image sensor are identical based on a first position and a second position;

calculating, based on the first position and the second position, a position of a target object that is determined as the identical object; and determining whether a current situation is such that a reliability of the identicalness determination is at a predetermined level or higher, wherein calculating the position of the target object includes:
calculating the position of the target object that is determined as the identical object based on the first distance and the second orientation in a case where the current situation is determined to be such that the reliability is at the predetermined level or higher; and
calculating the position of the target object that is determined as the identical object based on the second distance and the second orientation in a case where the current situation is determined not to be such that the reliability is at the predetermined level or higher.

* * * * *